United States Patent
Kray et al.

(10) Patent No.: US 11,692,462 B1
(45) Date of Patent: Jul. 4, 2023

(54) BLADE HAVING A RIB FOR AN ENGINE AND METHOD OF DIRECTING INGESTION MATERIAL USING THE SAME

(71) Applicant: General Electric Company, Schenectady, NY (US)

(72) Inventors: Nicholas J. Kray, Mason, OH (US); Weizeng Kong, Mason, OH (US); Anthony J. Maurer, Liberty Township, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/805,526

(22) Filed: Jun. 6, 2022

(51) Int. Cl.
*F01D 25/32* (2006.01)
*F01D 5/14* (2006.01)

(52) U.S. Cl.
CPC ............. *F01D 25/32* (2013.01); *F01D 5/145* (2013.01); *F05D 2260/607* (2013.01)

(58) Field of Classification Search
CPC ..... F01D 25/32; F01D 5/145; F05D 2260/607
See application file for complete search history.

(56) References Cited

U.S. PATENT DOCUMENTS

| | | | |
|---|---|---|---|
| 4,108,573 A | 8/1978 | Wagner | |
| 5,279,109 A * | 1/1994 | Liu | F02K 3/075 60/785 |
| 5,443,365 A | 8/1995 | Ingling et al. | |
| 6,503,053 B2 * | 1/2003 | Huebner | F04D 29/324 415/191 |
| 6,572,332 B2 | 6/2003 | Harvey et al. | |
| 6,779,979 B1 | 8/2004 | Wadia et al. | |
| 6,905,309 B2 | 6/2005 | Nussbaum et al. | |
| 7,753,652 B2 | 7/2010 | Truckenmueller et al. | |
| 8,241,003 B2 | 8/2012 | Roberge | |
| 8,591,195 B2 | 11/2013 | Di Florio et al. | |
| 9,091,175 B2 | 7/2015 | Durocher et al. | |
| 9,200,593 B2 | 12/2015 | Huth | |
| 9,702,255 B2 | 7/2017 | Martin et al. | |
| 10,260,361 B2 * | 4/2019 | Botrel | F01D 9/041 |
| 10,934,858 B2 | 3/2021 | Schroeder et al. | |
| 2014/0252159 A1 * | 9/2014 | Stretton | B64D 29/04 60/797 |
| 2017/0284303 A1 * | 10/2017 | Johnson | F02C 7/18 |

FOREIGN PATENT DOCUMENTS

| | | |
|---|---|---|
| EP | 3604762 A1 | 2/2020 |
| FR | 2867506 A1 | 9/2005 |

* cited by examiner

*Primary Examiner* — Jacob M Amick
*Assistant Examiner* — Charles J Brauch
(74) *Attorney, Agent, or Firm* — Venable LLP; Elizabeth C. G. Gitlin; Michele V. Frank

(57) ABSTRACT

A blade for an engine includes an airfoil body having a pressure side and a suction side, a base, and a rib located on the pressure side of the airfoil body. The rib includes a radially outer surface inclined radially outwardly with respect to the pressure side of the airfoil body and a scoop formed by the radially outer surface. The radially outer surface is inclined radially outward with respect to a normal axis to the pressure side of the airfoil body. The rib is angled at a positive angle with respect to the platform. An engine for and a method of directing ingestion material in an engine may employ the rib.

18 Claims, 4 Drawing Sheets

BLADE HAVING A RIB FOR AN ENGINE AND METHOD OF DIRECTING INGESTION MATERIAL USING THE SAME

TECHNICAL FIELD

The present disclosure relates to a blade having a rib and a related method.

BACKGROUND

An engine, such as an open rotor engine, includes fan blades and outlet guide vanes. During operation, the fan blades are rotated around a centerline of the engine. Air flowing past the fan blades enters an engine inlet to flow toward a core flowpath. One or more booster blades are included in the flow path to accelerate the air flow through the engine.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, or structurally similar elements.

DETAILED DESCRIPTION

Figure 1:
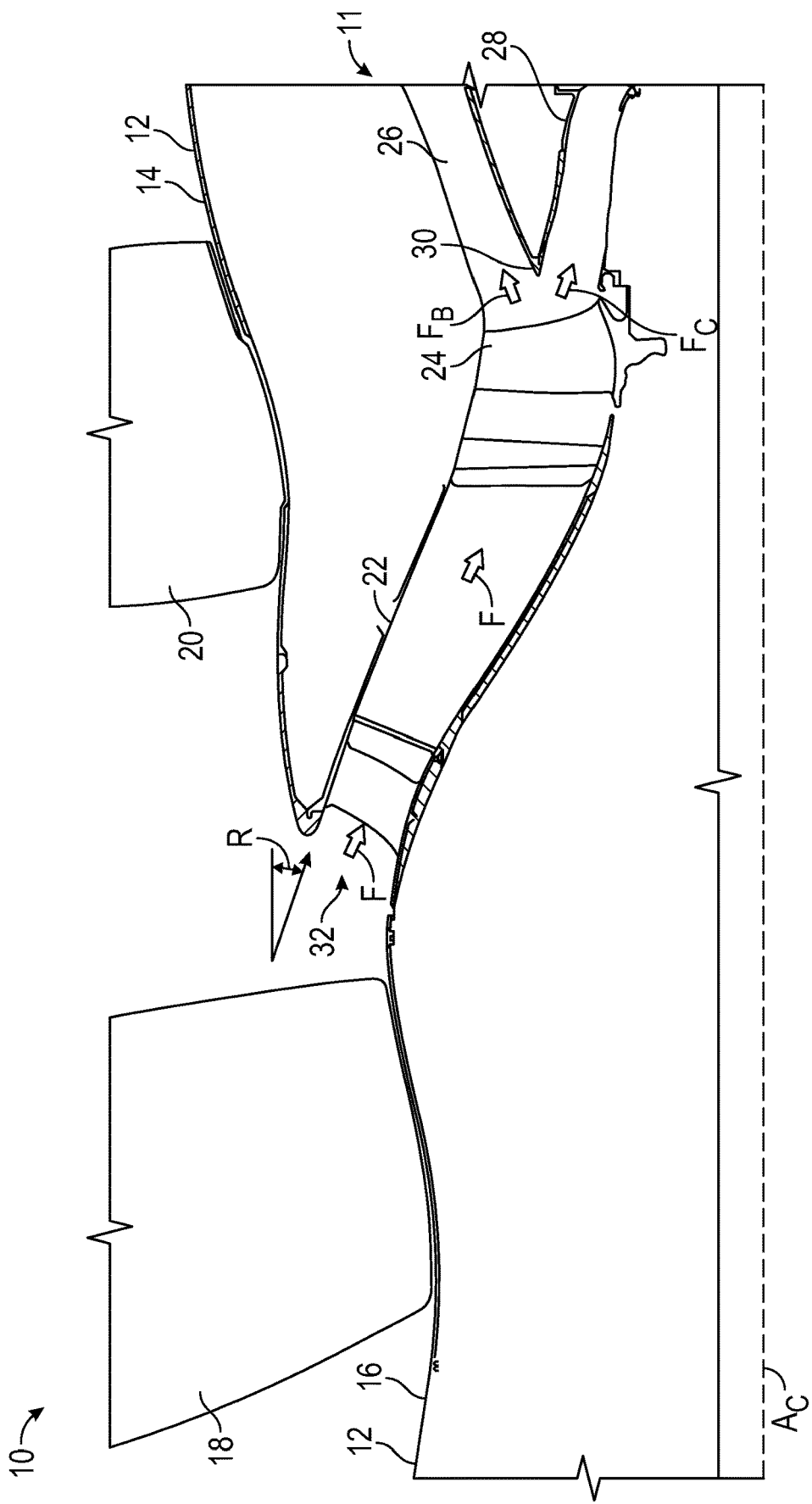
FIG. 1 shows a schematic, partial, cross-sectional, view of an engine, taken along a centerline of the engine, according to an embodiment of the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting as well as indirect coupling, fixing, attaching, or connecting through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a one, two, four, ten, fifteen, or twenty percent margin in either individual values, range(s) of values and/or endpoints defining range(s) of values.

During operation of an engine, and, in particular, during operation of an open rotor engine, ingestion material may bypass the fan blades and enter the engine inlet and flow toward the core flowpath (e.g., the flow path through the compressor section, the combustion section, and the turbine section). Such ingestion material, often soft-bodied animals, such as birds, may interfere with the operation of the engine. One or more ribs provided on the pressure side of the blades prior to the core flowpath operate as trajectory guides to direct the injection material toward the bypass flowpath and away from the core flowpath. This limits, reduces, and may prevent, entry of the ingestion material into the core flowpath.

FIG. 1 shows a partial, schematic, cross-sectional view of an engine 10. FIG. 1 shows a forward end of the engine 10. The engine 10 includes a housing 12. The housing 12 is formed of a nacelle 14 and a spinner 16, which may be coupled together. The nacelle 14 and the spinner 16 house internal components of the engine 10. The components may be, for example, gear systems, combustions systems, compressor systems, turbine systems, shafts for generating torque, and other known parts of the engine 10. The engine 10 may be a gas turbine engine.

The engine 10 includes one or more fan blades 18 and one or more outlet guide vanes 20 at the forward end. The one or more fan blades 18 are coupled to the spinner 16 and the one or more outlet guide vanes 20 are coupled to the nacelle 14. The engine 10 may be an open rotor engine. That is, the fan blades 18 are not bounded by a housing. In some examples, the open rotor engine is an unducted single fan engine.

With continued reference to FIG. 1, the engine 10 includes a gooseneck 22 that houses one or more blades 24, also referred to as booster blades 24, airfoils 24, and turbofan airfoils 24. The gooseneck 22 is also referred to as a midfan inlet 22 and a booster inlet 22. The gooseneck 22 has as an engine inlet 32 that allows air to enter the components of the engine 10. The gooseneck 22 is directed radially inward with respect to an engine centerline axis $A_C$ from the engine inlet 32 to a splitter nose 30. The gooseneck 22 is defined between the nacelle 14 and the spinner 16.

The gooseneck 22 is coupled to or connected to a split flowpath 11 at the splitter nose 30. The split flowpath 11 is formed of a bypass flowpath 26, also referred to as a bypass passage 26, and a core flowpath 28, also referred to as a core passage 28. The bypass passage 26 is defined between the nacelle 12 and an engine frame. The core passage 28 is defined between the spinner 16 and the engine frame. The engine frame is located radially between the core passage 28 and the bypass passage 26. The bypass passage 26 extends radially outward with respect to the engine centerline axis $A_C$ from the splitter nose 30 to an outlet (not visible). The core passage 28 extends radially inward with respect to the engine centerline axis $A_C$ from the splitter nose 30 to the engine components (e.g., the compressor, the combustor, etc.).

During operation, an air flow F enters the gooseneck 22 at the engine inlet 32.

The air flow F flows through the gooseneck 22 to the splitter nose 30. At this point, the air flow F splits into a core air flow $F_C$ through the core flowpath 28 and a bypass air flow FB through the bypass flowpath 26. The one or more blades 24 rotate about the engine centerline $A_C$. The one or more blades 24 are located upstream of the splitter nose 30, the bypass flowpath 26, and the core flowpath 28. The one or more blades 24 operate as booster blades 24 to increase the speed of the airflow F flowing through the engine 10 and thus may operate to increase the power and to improve the performance of the engine 10.

During operation, the spinner 16 rotates with respect to the nacelle 14 and the centerline axis $A_C$ of the engine. The one or more fan blades 18 (by virtue of the connection to the spinner 16) rotate circumferentially around the engine centerline $A_C$. The nacelle 14 is stationary such that the one or more outlet guide vanes 20 do not rotate around the engine centerline $A_C$ and are thus stationary with respect to rotation about the engine centerline $A_C$. Although the one or more outlet guide vanes 20 are stationary with respect to rotation about the engine centerline $A_C$, the one or more outlet guide vanes 20 are capable of being rotated, pivoted, angled, or otherwise moved with respect to the nacelle 14. Air may flow from the left side of FIG. 1 toward the right side of FIG. 1. A portion of the air flow may flow past the one or more fan blades 18 and enter the engine inlet 32 as described previously. The airflow then flows past the one or more blades 24 to the splitter nose 30. There, a portion of the air flow, the air flow Fe that flows through the core flowpath 28, may be mixed with a fuel flow for combustion in a known manner, and a portion of the air flow, the air flow FB, flows through the bypass flowpath 26.

During operation of the engine 10, ingestion material may enter the engine inlet 32. Such ingestion material may include soft-body ingestion material, such as, for example, birds and other soft-bodied animals. Ingestion material entering the engine inlet 32 may flow, with the airflow F, toward the one or more blades 24, bypass the one or more blades 24, and enter one or both of the bypass flowpath 26 and the core flowpath 28. In order to minimize, to reduce, to eliminate, or any combination thereof, the ingestion material entering the core flowpath 28 (and thus flowing into any one or more of the compressor section, the combustor section, or the turbine section), the one or more blades may include a rib 100 (FIG. 2) to guide the ingestion material away from the core flowpath 28 and toward the bypass flowpath 26.

As previously described, the engine 10 may be an open rotor or an unducted engine. That is, the fan blade 18 may have no outer housing or casing. This type of engine typically operates with lower rotational fan blade 18 speeds with a lower number of fan blades 18 as compared to housed or ducted engines, such as turbo engines. Due to the lower speeds and the fewer numbers of the fan blades 18, ingestion material may bypass the fan blades 18 and enter the gooseneck 22. The ingestion material is guided in the same direction of the gooseneck 22, which typically has an orientation toward the core flowpath 28. The rib 100 described herein alters the normal course of the ingestion material, guiding the ingestion material away from its course into the core flowpath 28 and, instead, aims the ingestion material radially outward toward the bypass flowpath 26. Thus, the rib 100 provides a trajectory guide for a split flow engine and for an open rotor or an unducted engine (e.g., the fan blades 18 have no outer housing or casing), such as shown in FIG. 1, to guide ingestion material away from the core flowpath 28 (and away from causing harm to the core components therein) and toward the bypass flowpath 26.

Various examples of the rib are shown and described with respect to FIGS. 2 to 6. The ribs shown and described with respect to FIGS. 2 to 6 are exemplary and features of the ribs may be incorporated with other ribs to achieve directing of the ingestion material away from the core flowpath 28 and toward the bypass flowpath 26.

Figure 2:
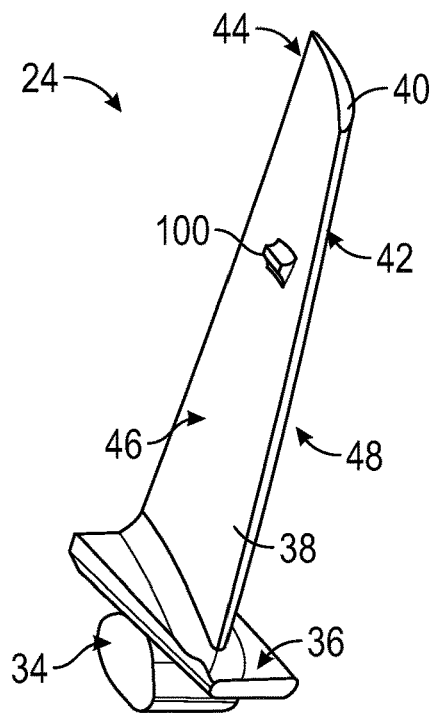
FIG. 2 shows a perspective view of a blade, according to an embodiment of the present disclosure.
Figure 3:
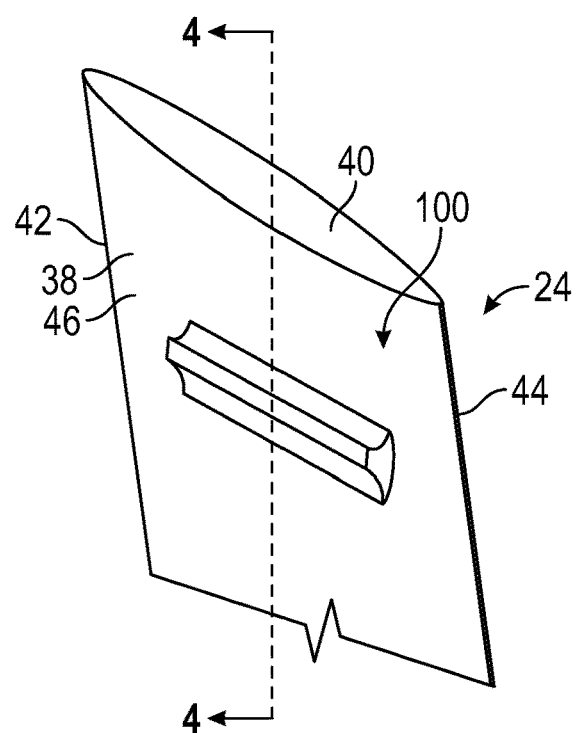
FIG. 3 shows a partial side perspective view of the blade of FIG. 2, according to an embodiment of the present disclosure.

FIGS. 2 and 3 show perspective views of one blade 24 of the one or more blades 24. Each blade 24 of the one or more blades 24 includes a base 34. The base 34 may be a dovetail 34 for connecting the blade 24 to a support structure within the engine. The dovetail 34 includes an upper surface 36 or a platform 36. Each blade 24 also includes an airfoil body 38 extending from the platform 36 to a tip 40. The airfoil body 38 includes a leading edge 42 and a trailing edge 44. The leading edge 42 is oriented toward the upstream portion of the engine 10 (e.g., toward the gooseneck 22 in FIG. 1) The airfoil body 38 includes a pressure side 46 and a suction side 48. A rib 100 is located on the pressure side 46 of the airfoil body 38 of the blade 24. The rib 100 is located on the pressure side 46 since the pressure side 46 is oriented into the direction of rotation. Thus, the rib 100 is also oriented in the direction of rotation and is able to guide the ingestion material in the desired direction, as described herein.

Figure 6:
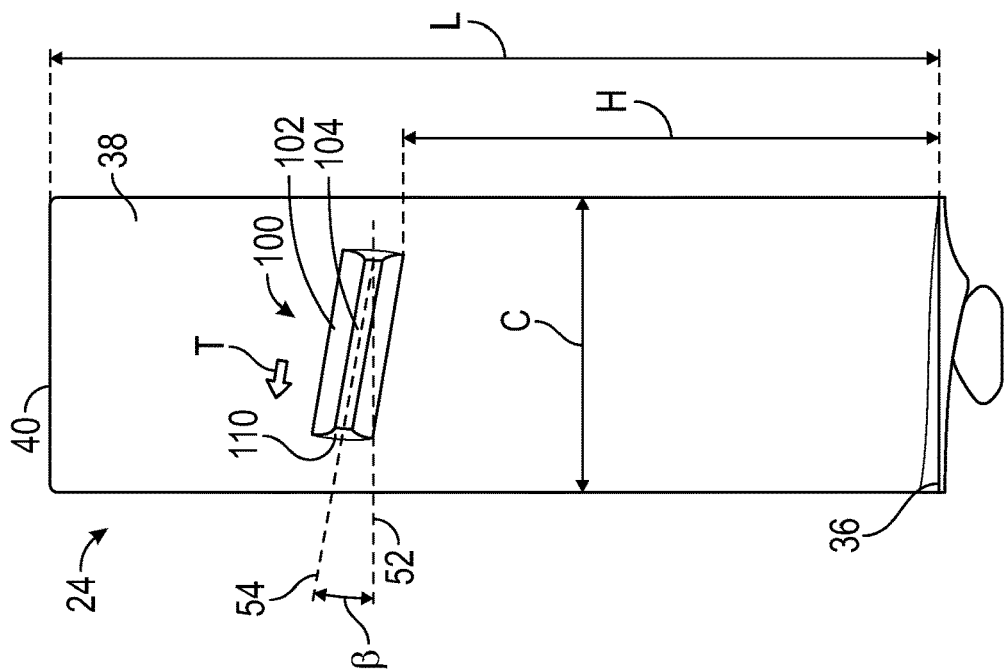
FIG. 6 shows a side view of the blade of FIG. 2, according to an embodiment of the present disclosure.
Figure 5:
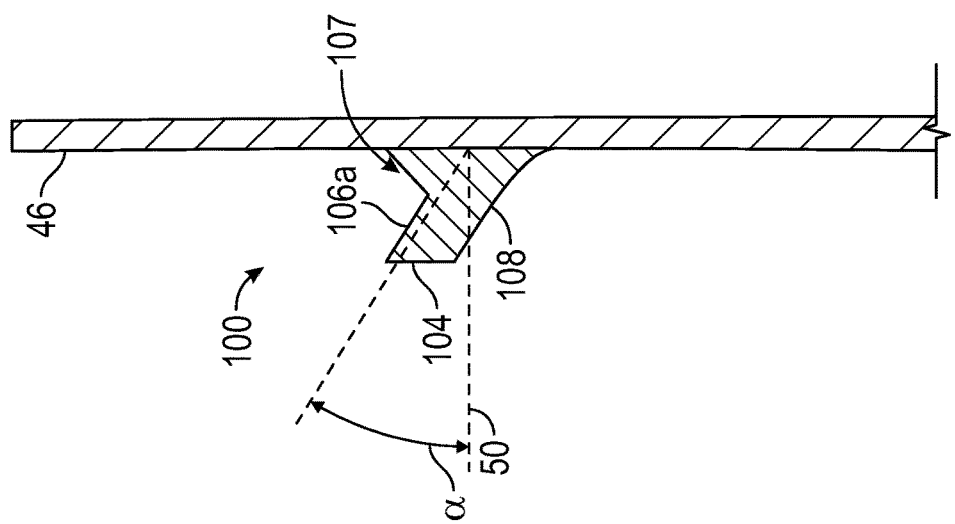
FIG. 5 shows an alternative partial cross-sectional view of the blade of FIG. 3, taken along the line 4-4, according to an embodiment of the present disclosure.
Figure 4:
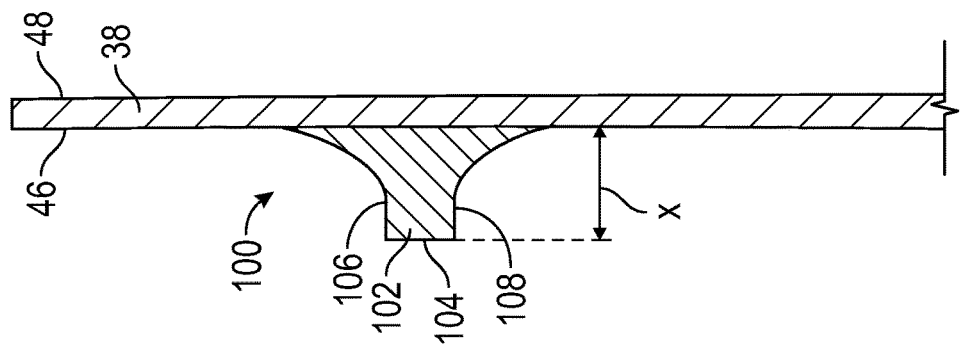
FIG. 4 shows a partial cross-sectional view of the blade of FIG. 3, taken along the line 4-4, according to an embodiment of the present disclosure.

FIGS. 4 to 6 illustrate optional orientations, shapes, and structures of the rib 100. Although shown and described in certain orientations, shapes, and structures in FIGS. 4 to 6, the rib 100 may take on any orientation, shape, or structure to aid in directing the ingestion material away from the core flowpath 28 (FIG. 1) and toward the bypass flowpath 26 (FIG. 1).

FIG. 4 shows a cross-sectional view of the rib 100 and the airfoil body 38 taken along the line 4-4 in FIG. 3. As mentioned, the rib 100 is located on the pressure side 46 of the airfoil body 38. The rib 100 includes a rib body 102 that may extend from the pressure side 46 of the airfoil body 38 to a side surface 104 of the rib 100. The rib 100 includes a width or standoff x defined between the pressure side 46 and the side surface 104. The standoff x is selected based on the speed of the blades 24, the speed of the incoming ingestion material, and other factors. The standoff x is selected to balance air flow past the blades 24 and the desired guide angle to move the ingestion material toward the bypass flowpath 26 (FIG. 1). The radial height of the rib 100 may be predetermined or selected to balance the operation of the blade 24 and the operation of the trajectory guide function.

The rib 100 includes a radially outer surface 106 and a radially inner surface 108. The radially outer surface 106, the radially inner surface 108, or both, may be curved between the pressure side 46 and the side surface 104. The curve may be convex or concave. In some examples, the radially outer surface 106, the radially inner surface 108, or both, may be perpendicular to the side surface 104, the pressure side 46, or both. The radially outer surface 106 and the radially inner surface 108 may have the same shape, mirrored shapes, or different shapes.

With reference to FIG. 5, the radially outer surface 106a may be inclined radially outward away from the airfoil body 38 to form a scoop 107. The scoop 107 may capture ingestion material to be directed radially outward. In this example, the radially outer surface 106a may be inclined at an angle α with respect to an axis 50 normal to the pressure side 46 of the airfoil body 38. Although only a portion of the radially outer surface 106a is shown inclined at the angle α, the entirety of the outer surface 106a may be inclined at the angle α. Although the radially outer surface 106a is shown to have a different shape than the radially inner surface 108, the radially inner surface 108 may be inclined in the same manner as the radially outer surface 106a. The angle α may be between zero degrees and thirty degrees, or any value or range therebetween. The angle α may be between ten degrees and thirty degrees. The angle α may be thirty degrees. The angle α may be any positive angle with respect to the axis 50 that aides in directing the ingestion material away from the core flowpath 28 (FIG. 1) and toward the bypass flowpath 26 (FIG. 1). As shown in FIG. 4, the angle α may be zero degrees.

Figure 7:
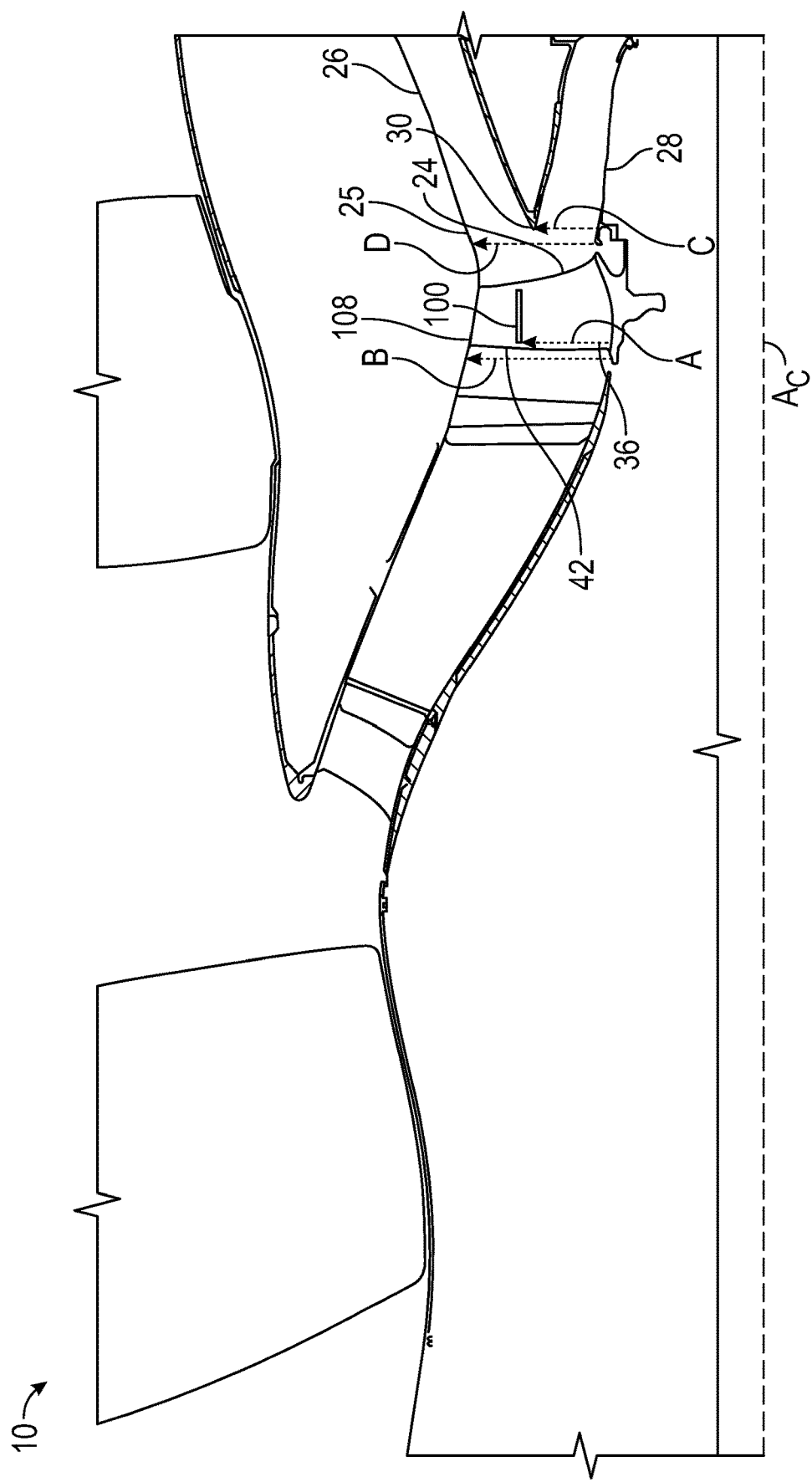
FIG. 7 shows a schematic, partial, cross-sectional view of an engine, taken along a centerline of the engine, according to an embodiment of the present disclosure.

Referring to FIG. 6, the rib body 102 of the rib 100 may be inclined radially outward from the airfoil body 38 in an upstream direction (e.g., as shown in FIG. 7). The rib 100 may be inclined with respect to an axis 52 parallel to the engine centerline axis $A_C$ (FIG. 1). An axis 54 parallel to the side surface 104 may be the reference point for inclining of the rib body 102. That is, the rib body 102 may be inclined at an angle β, where the angle β is defined between the axis 52 and the axis 54. The angle β may be between zero degrees and forty-five degrees, or any value or range therebetween. In some examples, the angle β is five degrees to thirty-five degrees. In some examples, the angle β is fifteen degrees to twenty degrees. The angle β may be any positive angle with respect to the axis 50 that aides in directing the ingestion material away from the core flowpath 28 (FIG. 1) and toward the bypass flowpath 26 (FIG. 1). The angle β may provide a trajectory T for the ingestion material that may be radially outward and away from the core flowpath 28 (FIG. 1). Accordingly, the angle β results in the rib 100 being orientated a positive angle with respect to the base 34 or the platform 36. The positive angle may be the same as angle β.

With continued reference to FIG. 6, the airfoil body 38 of the blade 24 extends from the platform 36 to the tip 40 of the blade 24. A span length L of the airfoil body 38 is defined between the platform 36 and the tip 40. The rib 100 may be located at between fifty percent and seventy percent of the span length L. That is, the distance H between the rib 100 (taken at the radially innermost surface of the rib 100) and the platform 36 may be forty percent to seventy percent of the span length L. The distance H may be fifty percent to seventy percent of the span length L. The distance H may be any value or range between forty percent and seventy percent. In some examples, the distance H is seventy percent of the span length L. The distance H may be any distance or height with respect to the platform 36 that aides in directing the ingestion material away from the core flowpath 28 (FIG. 1) and toward the bypass flowpath 26 (FIG. 1). The airfoil body 38 of the blade 24 extends from the leading edge 42 to the trailing edge 44 to define a chord length C. The rib 100 may extend over fifty percent to one hundred percent of the chord length C. In some examples, the rib 100 extends over fifty percent of the chord length C. In some examples, the rib 100 extends between fifty percent and ninety percent of the chord length C. The rib 100 may be centered along the chord length C. In some examples, the rib 100 may be off center along the chord length C.

FIG. 7 shows a partial, schematic, cross-sectional view of the engine 10 including a rib 100 on one or more of the one or more blades 24. Although not shown angled with respect to the centerline $A_C$ of the engine, the rib 100 may be angled as previously described. The height of a lower surface of the forward side 110 (FIG. 6) of the rib 100 may be located a distance A from the platform 36 of the blade 24. A distance B is also defined between the platform 36 the tip 40 of the blade 24 at the leading edge 42 of the blade 24. A distance C is defined as the height of the core flowpath 28 at the splitter nose 30. A distance D is defined as the height of a duct 25 immediately upstream of and adjacent the splitter nose 30. A rib parameter RP may be defined by these distances as set forth in Relationship (1) below.

$$RP = \frac{A/B}{C/D} \qquad (1)$$

The rib parameter RP describes the radial positioning of the rib 100 along the pressure side 46 (FIG. 6) of the rib 100. The rib parameter RP may be between 0.2 and 1.7. The rib parameter RP may be between 0.5 and 1.5. The rib parameter RP may be selected to change a trajectory of ingestion material from an angle R of the gooseneck 22 with respect to the engine centerline axis $A_C$ to a radially outward trajectory toward the bypass flowpath 26.

The addition of the rib 100 may affect the air flow past the booster blades 24. That is, depending on the angle β, the standoff x, and the number of booster blades 24, the rib 100 may affect the operation of the booster blades 24 and the engine 10. Thus, the rib 100 is designed to balance the impact on engine operation and the trajectory of ingestion material. The rib parameter RP may determine location of the rib 100 on the blade 24 and may be selected to balance the function of the booster blade 24 (e.g., to promote performance of the booster blade 24 in a manner that improves the speed of the air flow and improves performance of the engine) and the function of the trajectory rib 100 (e.g., to promote direction or guiding of ingestion material toward the bypass flowpath 26).

As discussed previously, and referring to FIGS. 1 to 7, the rib 100 is located on the pressure side 46 of the airfoil body 38. The rib 100 of the present disclosure, thus, operates as a trajectory guide to guide, to direct, or to redirect ingestion material away from the core flowpath. The rib 100 may be an airfoil scoop rib. That is, the rib 100 may operate to scoop soft ingestion material radially outward toward the bypass flowpath. The rib 100 is shaped and oriented to add additional radial trajectory to the ingestion material. That is, the trajectory of the ingestion material may be aligned with the angle R of the gooseneck 22 in a manner that directs the soft ingestion material toward the core flowpath 28. The rib 100 is located on the pressure side 46 of the blade 24 to change the trajectory of the ingestion material from being directed toward the core flowpath 28 to being directed to the bypass flowpath 26. The angles α and β of the rib 100 may be sized such that the majority of the ingestion material that spreads along the pressure side 46 of the airfoil body 38 gets directed or thrown radially outward toward the bypass flowpath 26. By majority, is meant that more ingestion material is directed to the bypass flowpath 26 than to the core flowpath 28.

Accordingly, the rib 100 of the present disclosure decreases the potential for ingestion material to enter the engine core in a multi-flow stream engine, such as engine 10 of FIG. 1, as compared to a multi-flow stream engine having blades 24 with no rib 100. The rib 100 also assists in the degradation or fragmentation of the ingestion material such that ingestion material that does flow into the core flowpath 28 is less than the ingestion material present in the gooseneck 22, thus reducing the negative impact the ingestion material may have toward engine operation.

Although a single rib 100 is shown and described herein, multiple ribs 100 may be provided. In some examples, multiple ribs 100 may be provided staggered along the span length L (FIG. 6) of the airfoil body 38. In those examples, the ribs 100 may be uniformly or nonuniformly spaced. In some examples, multiple ribs 100 may be provided staggered along the chord length C (FIG. 6) of the airfoil body 38. In those examples, the ribs 100 may be uniformly or nonuniformly spaced. In some examples, multiple ribs 100 may be provided along both the span length L and the chord length C.

Although the rib 100 of the present disclosure is shown and described with regard to a rotating blade 24, the rib 100 may be provided on a static blade. Furthermore, although described for use in an open rotor or for use with a slow fan blade rotational speeds, the trajectory guiding rib 100 of the present disclosure may be included in ducted engines, such as, for example, turbofan engines.

Further aspects of the present disclosure are provided by the subject matter of the following clauses.

According to an aspect of the disclosure, a blade for an engine comprises an airfoil body, a base, and at least one rib located on the pressure side of the airfoil body. The airfoil body has a pressure side and a suction side. The at least one rib located on the pressure side of the airfoil body has a radially outer surface inclined radially outwardly with respect to the pressure side of the airfoil body and a scoop formed by the radially outer surface, wherein the radially outer surface is inclined radially outward with respect to a normal axis to the pressure side of the airfoil body, and wherein the at least one rib is angled at a positive angle with respect to the base.

The blade of the preceding clause, wherein the radially outer surface is inclined at an angle with respect to the normal axis between zero degrees and third degrees.

The blade of the preceding clause, wherein the radially outer surface is inclined at an angle with respect to the normal axis of about thirty degrees.

The blade of any preceding clause, wherein the airfoil body is defined by a chord length, and wherein the at least one rib covers more than fifty percent of the chord length.

The blade of any preceding clause, wherein the at least one rib comprises a plurality of ribs spaced apart on the pressure side of the airfoil body.

The blade of any preceding clause, wherein the airfoil body is defined by a span length, and wherein the at least one rib is located at a distance between fifty percent and seventy percent of the span length.

The blade of any preceding clause, wherein the distance is about seventy percent of the span length.

The blade of any preceding clause, wherein the positive angle is between zero degrees and forty-five degrees.

The blade of any preceding clause, wherein the positive angle is between fifteen degrees and twenty degrees.

The blade of any preceding clause, wherein the base is a dovetail having a platform, the dovetail for connecting the airfoil body to the engine, and wherein the positive angle is with respect to the platform of the dovetail.

According to an aspect of the disclosure, an engine comprises one or more fan blades, a gooseneck downstream of the one or more fan blades, and one or more booster blades located in the gooseneck. Each of the one or more booster blades includes a pressure side, a suction side, and a trajectory rib on the pressure side of at least one of the one or more booster blades, the trajectory rib for directing ingestion material within the gooseneck.

The engine of any preceding clause, wherein each of the one or more booster blades is a rotating blade.

The engine of any preceding clause, wherein each of the one or more booster blades is a static blade.

The engine of any preceding clause, wherein the engine is an open rotor engine.

The engine of any preceding clause, wherein the trajectory rib is characterized by a rib parameter between 0.2 and 1.7.

The engine of any preceding clause, wherein the trajectory rib is inclined at an angle with respect to a centerline axis of the engine.

The engine of any preceding clause, further including a splitter nose downstream of the one or more booster blades, a bypass passage extending radially outward with respect to an engine centerline axis from the splitter nose, and a core passage extending radially inward with respect to the engine centerline axis from the splitter nose.

The engine of any preceding clause, wherein the trajectory rib directs the ingestion material from a first trajectory toward the core passage to a second trajectory toward the bypass passage.

The engine of any preceding clause, wherein the bypass passage is defined between an engine frame and a nacelle of the engine and the core passage is defined between the engine frame and a spinner of the engine.

According to an aspect of the disclosure, a method of directing ingestion material in an engine comprises rotating one or more fan blades to generate an airflow, directing the airflow through an air flowpath of the engine toward a split flowpath, rotating one or more boosters blades in the air flowpath, and directing ingestion material from the air flowpath toward a radially outer flowpath of the split flowpath.

The method of the preceding clause, wherein directing ingestion material comprises scooping the ingestion material on a rib on each of the one or more booster blades and changing a trajectory of the ingestion material from the air flowpath to the radially outer flowpath.

The method of any preceding clause, wherein directing ingestion material reduces an amount of ingestion material flowing into a radially inner flowpath of the split flowpath.

Although the foregoing description is directed to the preferred embodiments, other variations and modifications will be apparent to those skilled in the art, and may be made without departing from the spirit or the scope of the disclosure. Moreover, features described in connection with one embodiment may be used in conjunction with other embodiments, even if not explicitly stated above.

The invention claimed is:

1. A blade for an engine, the blade comprising:
   (a) an airfoil body having a pressure side and a suction side;

(b) a base; and
(c) at least one rib located on the pressure side of the airfoil body, the at least one rib having:
   (i) a radially outer surface inclined radially outwardly with respect to the pressure side of the airfoil body; and
   (ii) a scoop formed by the radially outer surface, wherein the radially outer surface is inclined radially outward with respect to a normal axis to the pressure side of the airfoil body, and wherein the at least one rib is angled at a positive angle with respect to the base.

2. The blade of claim 1, wherein the radially outer surface is inclined at an angle with respect to the normal axis between zero degrees and thirty degrees.

3. The blade of claim 1, wherein the airfoil body is defined by a chord length, and wherein the at least one rib covers more than fifty percent of the chord length.

4. The blade of claim 1, wherein the at least one rib comprises a plurality of ribs spaced apart on the pressure side of the airfoil body.

5. The blade of claim 1, wherein the positive angle is between zero degrees and forty-five degrees.

6. The blade of claim 1, wherein the base is a dovetail having a platform, the dovetail for connecting the airfoil body to the engine, and wherein the positive angle is with respect to the platform of the dovetail.

7. The blade of claim 1, wherein the airfoil body is defined by a span length, and wherein the at least one rib is located at a distance between fifty percent and seventy percent of the span length.

8. The blade of claim 7, wherein the distance is about seventy percent of the span length.

9. An engine comprising:
(a) one or more fan blades;
(b) a gooseneck downstream of the one or more fan blades;
(c) one or more booster blades located in the gooseneck, at least one of the one or more booster blades including a pressure side, a suction side, and a trajectory rib on the pressure side of at least one of the one or more booster blades;
(d) a core passage located downstream of the one or more booster blades; and
(e) a bypass passage located downstream of the one or more booster blades,
wherein the trajectory rib is configured to direct an ingestion material within the gooseneck from a first trajectory toward the core passage to a second trajectory toward the bypass passage.

10. The engine of claim 9, wherein each of the one or more booster blades is a rotating blade.

11. The engine of claim 9, wherein each of the one or more booster blades is a static blade.

12. The engine of claim 9, wherein the engine is an open rotor engine.

13. The engine of claim 9, wherein the trajectory rib is characterized by a rib parameter between 0.2 and 1.7.

14. The engine of claim 9, wherein the trajectory rib is inclined at an angle with respect to a centerline axis of the engine.

15. The engine of claim 9, further comprising:
a splitter nose downstream of the one or more booster blades;
the bypass passage extending radially outward with respect to an engine centerline axis from the splitter nose; and
the core passage extending radially inward with respect to the engine centerline axis from the splitter nose.

16. The engine of claim 15, wherein the bypass passage is defined between an engine frame and a nacelle of the engine and the core passage is defined between the engine frame and a spinner of the engine.

17. A method of directing ingestion material in an engine, the method comprising:
rotating one or more fan blades to generate an airflow;
directing the airflow through an air flowpath of the engine toward a split flowpath;
rotating one or more booster blades in the air flowpath; and
directing an ingestion material from the air flowpath toward a radially outer flowpath of the split flowpath, wherein directing the ingestion material comprises scooping the ingestion material on a rib on each of the one or more booster blades, and changing a trajectory of the ingestion material from the air flowpath to the radially outer flowpath.

18. The method of claim 17, wherein directing the ingestion material reduces an amount of ingestion material flowing into a radially inner flowpath of the split flowpath.

* * * * *